(12) United States Patent
Dobos

(10) Patent No.: US 12,334,592 B2
(45) Date of Patent: Jun. 17, 2025

(54) BATTERY MODULE CONNECTOR, METHOD FOR MANUFACTURING A BATTERY MODULE CONNECTOR, AND BATTERY SYSTEM

(71) Applicant: Lisa Draexlmaier GmbH, Vilsbiburg (DE)

(72) Inventor: Leonard Dobos, Gerzen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 555 days.

(21) Appl. No.: 17/724,884

(22) Filed: Apr. 20, 2022

(65) Prior Publication Data

US 2022/0336928 A1    Oct. 20, 2022

(30) Foreign Application Priority Data

Apr. 20, 2021   (DE) .................. 10 2021 109 918.8

(51) Int. Cl.
*H01M 50/505*    (2021.01)
*H01B 5/12*    (2006.01)
*H01M 50/204*    (2021.01)
*H01M 50/543*    (2021.01)

(52) U.S. Cl.
CPC ............ *H01M 50/505* (2021.01); *H01B 5/12* (2013.01); *H01M 50/204* (2021.01); *H01M 50/543* (2021.01); *H01M 2220/20* (2013.01)

(58) Field of Classification Search
CPC ............ H01M 50/505; H01M 50/204; H01M 50/543; H01M 50/502; H01M 50/521; H01M 50/522; H01M 50/503; H01M 50/249; H01M 50/258; H01M 2220/20; H01B 5/12; H01B 5/14; H01B 9/024; H01B 11/1033; H01B 11/1813; H01B 13/2606
See application file for complete search history.

(56) References Cited

U.S. PATENT DOCUMENTS

| | | | |
|---|---|---|---|
| 4,127,704 A * | 11/1978 | Touchard .......... | H01M 10/0422 429/94 |
| 9,853,435 B1 | 12/2017 | Burkman | |
| 10,461,299 B1 | 10/2019 | McKinnon et al. | |
| 2004/0023530 A1 * | 2/2004 | Garcia ................... | H05K 3/368 439/75 |

(Continued)

FOREIGN PATENT DOCUMENTS

| | | | |
|---|---|---|---|
| DE | 102010034686 | * | 2/2012 |
| DE | 102012019108 | | 4/2014 |
| JP | 2015041532 | | 3/2015 |

*Primary Examiner* — Matthew W Van Oudenaren
(74) *Attorney, Agent, or Firm* — Burris Law, PLLC

(57) ABSTRACT

A battery module connector for electrically conductive connecting of two battery modules includes a first contact element for electrically conductive contacting of a first battery module, a second contact element for electrically conductive contacting of a second battery module, a band-shaped wire braid that is electrically conductively connected at a first end to the first contact element and at a second end to the second contact element, and at least one spring element that is inserted into a section of the wire braid between the first end and the second end, and is configured to impinge the section with a spring force such that the section is widened radially with respect to a longitudinal axis of the wire braid.

9 Claims, 2 Drawing Sheets

(56) References Cited

U.S. PATENT DOCUMENTS

| | | | |
|---|---|---|---|
| 2006/0190070 A1* | 8/2006 | Dieck | A61F 2/97 623/1.12 |
| 2015/0357609 A1* | 12/2015 | Lang | B60L 53/16 320/113 |
| 2020/0194766 A1* | 6/2020 | Gonzales | H01R 9/16 |

* cited by examiner

BATTERY MODULE CONNECTOR, METHOD FOR MANUFACTURING A BATTERY MODULE CONNECTOR, AND BATTERY SYSTEM

CROSS-REFERENCE TO RELATED APPLICATIONS

This application is claims priority to and the benefit of DE 10 2021 109 918.8, filed on Apr. 20, 2021. The disclosure of the above application is incorporated herein by reference.

FIELD

The present disclosure relates to a battery module connector, a method for manufacturing such a battery module connector, as well as a battery system.

BACKGROUND

The statements in this section merely provide background information related to the present disclosure and may not constitute prior art.

The spacing between individual battery modules of a battery system, such as a drive battery for an electric vehicle, can fluctuate by several millimeters depending on the manner of manufacturing. The spacing can also further change in operation due to thermal and/or mechanical loads. Accordingly with the use of rigid battery module connectors, such as, for example, of copper blocks, a high mechanical load of the battery module connectors and/or the battery modules connected thereto can result.

SUMMARY

This section provides a general summary of the disclosure and is not a comprehensive disclosure of its full scope or all of its features.

In one form, the present disclosure improves the electrical contacting of two battery modules. In one form, the present disclosure provides a battery module connector that is flexible in a longitudinal direction, which makes possible a secure electrical contacting.

The approach described in the following is based on the fact that a battery module connector including a flexible wire braiding can be realized. Thus spacing fluctuations of several millimeters, in one variation of more than plus/minus three millimeters, can be compensated for. The mechanical load of the battery module connector and of the battery modules connected thereto can thus be significantly reduced. In order to inhibit gaps forming between the wires of the wire braid, in one form, during the compressing of the wire braid, the wires can be pressed against each other by spring force. A secure contacting can thus be provided. In one form, overheating of the wire braid can thereby be reduced.

In one form, the present disclosure relates to a battery module connector for electrically conductive connecting of two battery modules. The battery module connector comprises a first contact element for electrically conductive contacting of a first battery module, a second contact element for electrically conductive contacting of a second battery module, a band-shaped wire braid having a first end and a second end, that is electrically conductively connected at the first end to the first contact element and at the second end to the second contact element, and at least one spring element that is inserted into a section of the wire braid between the first end and the second end, and is configured to impinge the section with a spring force such that the section is widened radially with respect to a longitudinal axis of the wire braid.

The battery modules can be components of a battery system. The battery modules can be connected to one another in series and/or in parallel via one or more battery module connectors.

The battery system can be, in one form, a high-voltage battery having a rated voltage of at least 300 V, in one variation of at least 400 V. In one form, the battery module connector can also be referred to as a high-voltage connector.

In one form, the battery system can be a drive battery for an electric vehicle such as an electric car, electric truck, electric bus, or electric two-wheeler. However, other applications of the battery system are also possible.

In one form, the battery system can be embodied as a lithium-ion battery, in one variation, in the form of a lithium-polymer battery or a lithium-iron-phosphate battery. However, other forms of the battery system are also conceivable.

Each battery module can comprise a plurality of battery cells. In addition to the battery cells, the battery module can comprise a sensor system for measuring a voltage, a current, and/or a temperature of the battery cells, and/or control electronics for influencing a voltage, a current, and/or a temperature of the battery cells. The battery module can further comprise a module housing for receiving the battery cells, the sensors system, and/or the control electronics.

A battery cell can be understood in general to be a galvanic cell for converting between chemical and electrical energy. In one form, the battery cell can comprise two electrodes and an electrolyte. The battery cells can be embodied, in one variation, as prismatic cells and/or as so-called pouch cells including a pouch- or pocket-type outer sleeve. The battery cells can be connected to one another in series and/or in parallel.

A wire mesh can be understood to be a flexible band manufactured by interweaving of a plurality of wires, in one form, in plait- and/or hose-shape. In one form, the wire braid can be braided from a plurality of wire strands, wherein each wire strand, also called a braid, can be manufactured from a plurality of individual wires. The wire braid can be braided, in one form, from copper wires. However, other wire materials are also conceivable.

The first or second contact element can be, in one form, a copper block. The contact elements can be manufactured from the same material as the wire braid or from a different material than the wire braid. The contact elements can be connected to the respective ends of the wire braid in a materially-bonded or friction-fit manner, in one form, by soldering and/or welding. In one form, the contact elements can be embodied as screw terminals. However, other forms of the contact elements familiar to the person skilled in the art are also possible.

The spring element can be pushed into and/or woven into the wire braid.

In one form, the spring element can be embodied, in one variation, as a tube. The outer diameter of the tube can be chosen such that the wire braid is widened by inserting of the tube into the wire braid with a certain spring force. The tube can be manufactured from plastic and/or metal.

In another form, the spring element can be embodied, in one variation, as tube- or hose-shaped mesh similar to a stent in medical technology.

In yet another form, the spring element can be embodied as a leaf spring element including two leaf springs installed against each other, also referred to as an elliptical spring.

The spring element can be configured to impinge the wire braid with the spring force such that the wire braid is configured slightly baggy at least in sections. A tightening of the wire braid is thereby effected overall, i.e., it can inhibit gaps from forming between the individual wires or wire strands of the wire braid during the compressing of the wire braid. Thus, on the one hand, an issue of an overheating of the wire braid and/or a spark-formation between the individual wires and/or wire strands can be significantly reduced. On the other hand, an excessive tensile load of the wire braid can thus be reduced.

The spring force can be chosen in a manner dependent on a longitudinal compensation tolerance to be achieved. The longitudinal compensation tolerance can be, in one form, at least plus/minus 3 mm. However, longitudinal compensation tolerances of at least plus/minus 10 mm are also possible. The spring force should be chosen such that the wire braid is not excessively loosened when compressed. On the other hand, the spring force should be chosen such that during stretching the individual wires or wire strands of the wire braid are not excessively subjected to tensile load, or possibly only to a very low degree.

In other words, using the spring element allows the wires and/or wire strands of the wire braid to abut against one another in a tightly packed manner during the stretching and/or compressing of the wire braid within a permissible tolerance range. It is also advantageous that the permissible tolerance range can be chosen significantly greater in comparison to forms without such a spring element, in one form, greater than plus/minus 3 mm, in one variation greater than plus/minus 10 mm. Damage to the battery module connector and/or the battery modules connected thereto can thus be reduced during the installation and/or in operation, without functional limitations having to be taken into account for this purpose. The manufacturing expense with the positioning and/or fixing of the battery module can also be significantly reduced.

In another form, the present disclosure relates to a battery system that comprises at least one first battery module and one second battery module as well as at least one battery module connector according to one form of the teachings of the present disclosure. Here the first battery module and the second battery module are electrically conductively connected to each other via the battery module connector. Such a battery system can be manufactured in a simple and cost-effective manner due to the simplified electrical contact of the battery module.

In yet another form, the present disclosure relates to a method for manufacturing a battery module connector according to one form the teachings of the present disclosure. The method comprises at least the following steps that can, in one variation, be carried out in the specified order: manufacturing of the band-shaped wire braid having a first end and a second end by interweaving of a plurality of wires, wherein the at least one spring element is inserted into the wire braid during the braiding of the wires, and electrically conductive connecting of the wire braid at the first end to the first contact element, and at the second end to the second contact element.

In other words, the spring element can already be inserted into a section between the first end and the second end of the wire braid during the manufacturing of the wire braid. In one form, during the manufacturing of the wire braid, the spring element can be braided at least sectionally by the wires and/or braided with the wires. An additional step for inserting of the spring element into the (finished) wire braid can thus be omitted.

It is possible that the spring element is manufactured during the manufacturing of the wire braid. In one form, the spring element can be braided, in a similar manner to the wire braid, from wires and/or plastic fibers, in one form, into a tube-shaped mesh that can also be referred to as a stent. In other words, the wire braid and the spring element can respectively be manufactured in one and the same manufacturing step.

Features of the method according to one form of the teachings of the present disclosure can also be features of the battery module connector, and vice versa.

Possible features and advantages of forms of the teachings of the present disclosure can, inter alia, and without limiting the disclosure, be seen as based on the ideas and findings described below.

According to one form, the spring element is embodied as a tube. The tube can be a plastic or metal tube or a combination of the two. Such a tube-shaped spring element can be manufactured in a cost-effective manner and inserted into the wire braid with low effort, in one form, by inserting into an open end of the wire braid or between individual wire strands of the wire braid.

According to one form, the spring element is embodied as a tube-shaped mesh for impinging of the section with the spring force. The mesh can be braided from wires and/or plastic fibers. The mesh can be, in one form, similar to a stent. The spring element can thus be embodied in a particularly compact and flexible manner.

According to one form, the spring element comprises two leaf springs disposed opposite each other for impinging of the section with the spring force. The leaf springs can be manufactured from metal and/or plastic. The wire braid can extend at least partially about the leaf springs in the circumferential direction. Here, the leaf springs can be configured to impinge the wire braid in opposing radial directions with the spring force. In one form, a permanent tightening of the wire braid can also be provided, in one variation in the compressed state of the wire braid.

According to one form, the wire braid is embodied as a hose-shaped body. In other words, the wire braid can be embodied as an elongated, flexible hollow body including at least one open end. Here, the spring element can have been inserted into the wire braid via the open end. This makes possible a simple manufacturing of the battery module connector.

According to one form, a plurality of spring elements is inserted and formed in different sections of the wire braid between the first end and the second end in order to impinge the different sections with a spring force such that the different sections are widened radially with respect to the longitudinal axis of the wire braid. The spring elements of different sections can have identical or different spring properties. The flexibility of the wire braid can thus be increased, which is advantageous in one variation with longer forms of the wire braid.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
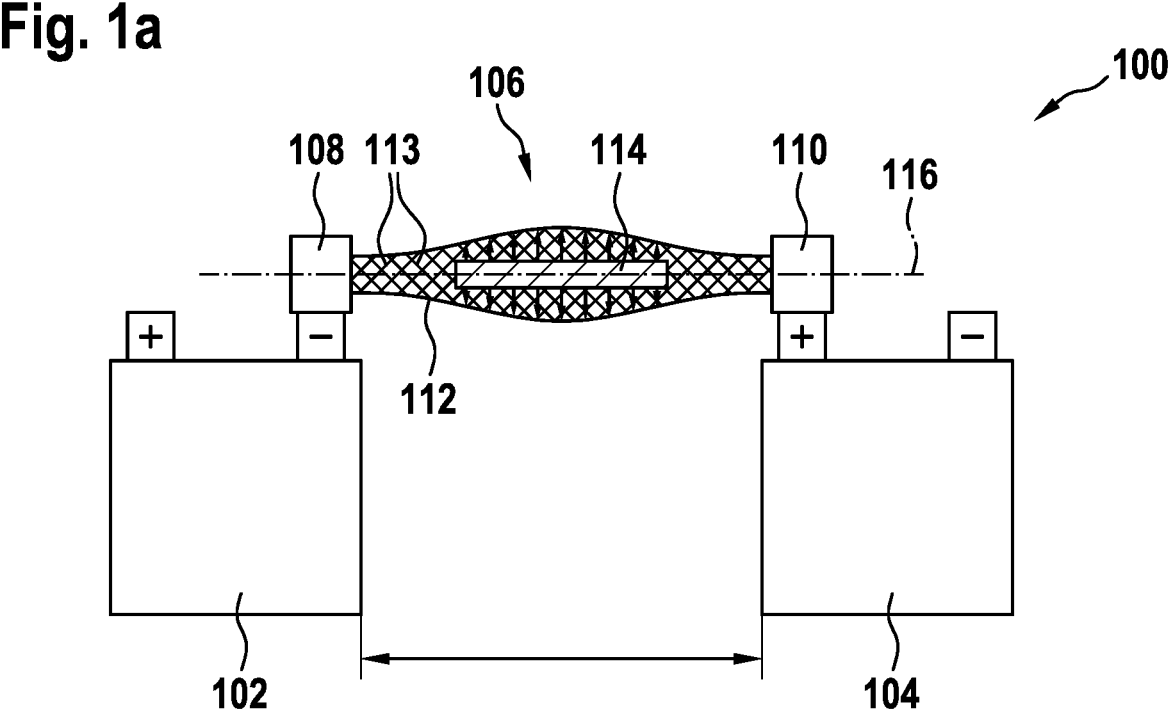
FIG. 1a is a schematic view of a battery system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1a schematically shows a battery system 100 that comprises a first battery module 102 and a second battery module 104. Each of the battery modules 102, 104 has a positive terminal ("+") and a negative terminal ("−") for electrical contacting. In this form, the two battery modules 102, 104 are connected to each other in series via a battery module connector 106.

The battery modules 102, 104 can be, in one form, high-voltage lithium-ion batteries.

The battery module connector 106 comprises a first contact element 108 that is electrically conductively connected to the negative terminal of the first battery module 102, and a second contact element 110 that is electrically conductively connected to the positive terminal of the second battery module 104. In one form, the contact elements 108, 110 can be screwed to the respective negative or positive pole.

The contact elements 108, 110 can each be embodied, in one form, as a copper block. However, other forms of the contact elements 108, 110 familiar to the person skilled in the art are also possible.

Furthermore, the battery module connector 106 comprises a band-shaped wire braid 112 that is braided from a plurality of individual wires 113, in one variation from copper wires. In one form, the wire braid 112 can be braided plait- and/or hose-shaped.

The two contact elements 108, 110 are electrically conductively connected to each other via the wire braid 112. In one form, the wire braid 112 can be welded and/or soldered, in one variation, at its first end to the first contact element 108, and at its second end to the second contact element 110. However, a friction- and/or interference-fit connection of the two contact elements 108, 110 to the wire braid 112 is also conceivable.

A spring element 114 is inserted in a section of the wire braid 112 located between the two contact elements 108, 110. The spring element 114 can be configured to impinge the wire braid 112 with a radially outwardly directed spring force two-dimensionally relative to its longitudinal axis 116 (marked with a plurality of small arrows) so that a slight bulging of the wire braid 112 is effected. The individual wires 113 are thereby pressed against each other, i.e., fixed relative to each other. Thus, in one form, with a compressing of the wire braid 112, due to manufacturing- and/or operating-related fluctuations of a horizontal spacing between the two battery modules 102, 104 (indicated with a double arrow), it can inhibit gaps, i.e., possible leakage paths, from forming between the individual wires 113.

Figure 1B:
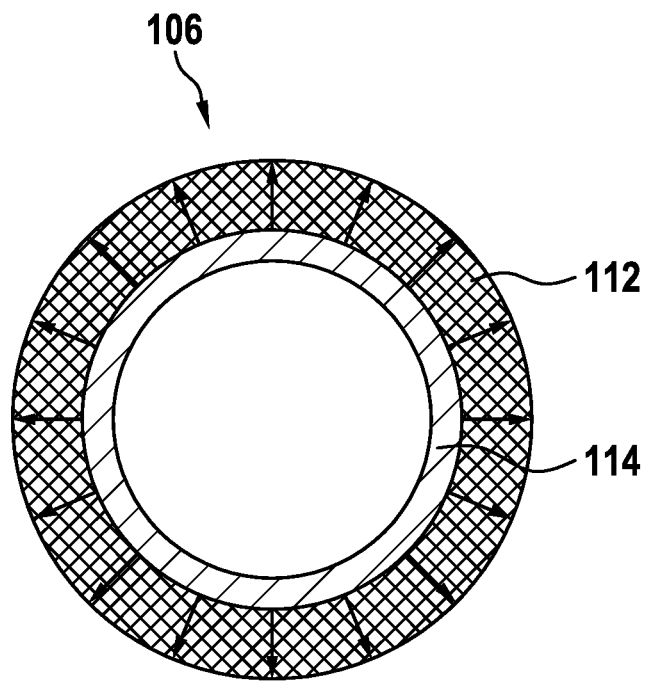
FIG. 1b is a cross-sectional view of a battery module connector from FIG. 1a, according to the teachings of the present disclosure.
Figure 3:
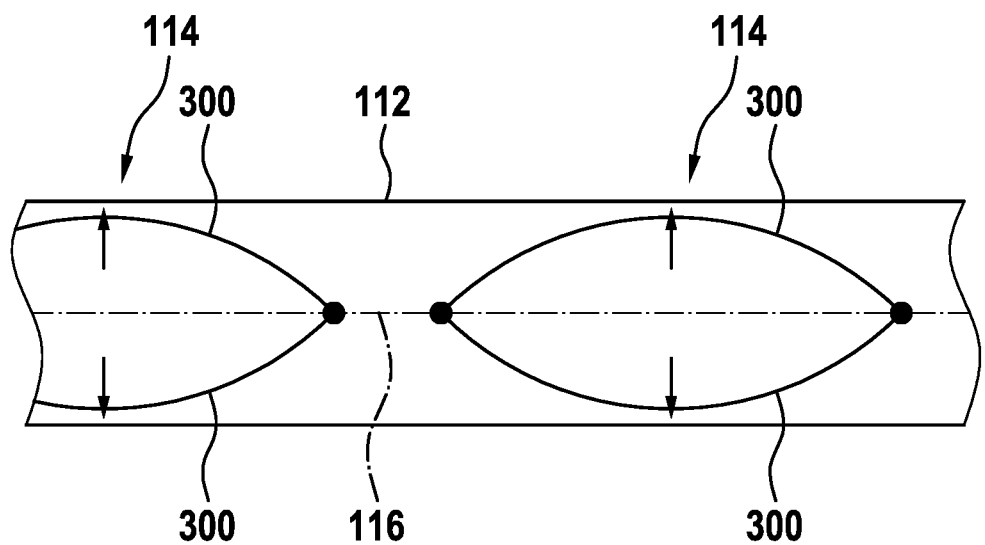
FIG. 3 is a schematic view of a section of a battery module connector according to the teachings of the present disclosure.

FIG. 1b shows the battery module connector 106 in cross-section. Here, it can be seen that the spring element 114 can impinge the wire braid 112, which is embodied here as hose-shaped as in one form, circumferentially with the spring force in the tangential direction. It is also possible that the wire braid 112 is impinged in two opposing radial directions with the spring force, as illustrated in FIG. 3.

Figure 2:
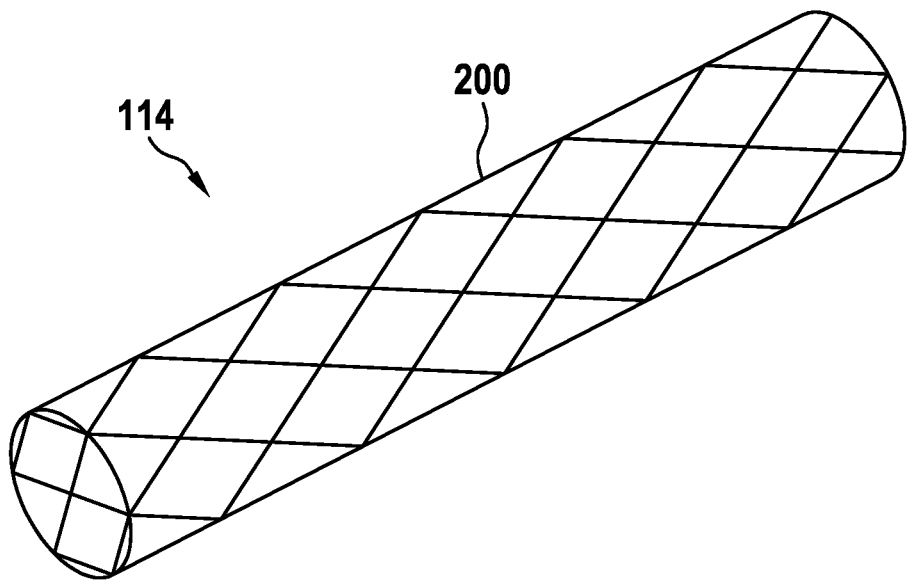
FIG. 2 is a perspective view of a spring element for a battery module connector according to the teachings of the present disclosure.

The spring element 114 can be tube-like, as shown in FIGS. 1a to 2.

It is possible that the spring element 114 is inserted between the individual wires 113. In one form, the spring element 114 can be wound at least partially by the individual wires 113 and/or braided therewith.

In one form, the spring element 114 can be embodied as a tube-shaped mesh 200 for impinging of the wire braid 112 with the spring force, for example, similar to a stent (see FIG. 2).

In another form, the spring element 114 can be embodied as a leaf spring assembly made of at least two leaf springs 300 (see FIG. 3). Here, the leaf springs 300 can be disposed opposite each other inside the wire braid 112, and—as mentioned above—configured to impinge the wire braid 112 in two opposing radial directions with the spring force (indicated by two opposing arrows).

It is possible that more than one spring element 114 is inserted into the wire braid 112. In one form, a plurality of meshes 200 and/or a plurality of leaf spring assemblies are each made of two leaf springs 300 can be disposed one-behind-the-other in and/or on the wire braid 112, as is schematically indicated in FIG. 3.

It is particularly advantageous when the spring element 114 is already inserted into the wire braid 112 during the manufacturing of the wire braid 112, i.e., the spring element 114 is braided by the wire braid 112 or woven thereinto. The two ends of the wire braid 112 can subsequently be electrically conductively connected to the respective contact element 108 or 110.

Since the above-described devices and methods described in detail are example forms, the devices and methods can be modified in a conventional manner by the person skilled in the art to a wide extent without leaving the field of the disclosure. In particular, the mechanical assemblies and the size ratios of the individual elements with respect to one another are only exemplary.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery module connector for electrically conductive connecting of two battery modules, the battery module connector comprising:
   a first contact element for electrically conductive contacting of a first battery module;
   a second contact element for electrically conductive contacting of a second battery module;
   a band-shaped wire braid having a first end and a second end, wherein the band-shaped wire braid is electrically conductively connected at the first end to the first contact element, and at the second end to the second contact element; and
   at least one spring element, wherein the at least one spring element is inserted into a section of the band-shaped wire braid between the first end and the second end, and is configured to impinge the section with a spring force such that the section is widened radially with respect to a longitudinal axis of the band-shaped wire braid,
   wherein the at least one spring element exerts radial spring forces in at least two radial directions onto the band-shaped wire braid, perpendicular to the longitudinal axis of the band-shaped wire braid.

2. The battery module connector according to claim 1, wherein the at least one spring element is a tube.

3. The battery module connector according to claim 1, wherein the at least one spring element comprises a tube-shaped mesh for impinging of the section with the spring force.

4. A battery module connector for electrically conductive connecting of two battery modules, the battery module connector comprising:
   a first contact element for electrically conductive contacting of a first battery module;
   a second contact element for electrically conductive contacting of a second battery module;
   a band-shaped wire braid having a first end and a second end, wherein the band-shaped wire braid is electrically conductively connected at the first end to the first contact element, and at the second end to the second contact element; and
   at least one spring element, wherein the at least one spring element is inserted into a section of the band-shaped wire braid between the first end and the second end, and is configured to impinge the section with a spring force such that the section is widened radially with respect to a longitudinal axis of the band-shaped wire braid,
   wherein the at least one spring element comprises two leaf springs, wherein the two leaf springs are disposed opposite each other for impinging of the section with the spring force.

5. The battery module connector according to claim 1, wherein the band-shaped wire braid is hose-shaped.

6. The battery module connector according to claim 1, wherein the at least one spring element comprises a plurality of spring elements inserted in different sections of the band-shaped wire braid between the first end and the second end, and configured to impinge the different sections with a spring force such that the different sections are widened radially with respect to the longitudinal axis of the band-shaped wire braid.

7. A battery system, comprising:
   at least one first battery module and one second battery module;
   at least one battery module connector according to claim 1, wherein the first battery module and the second battery module are electrically conductively connected to each other via the battery module connector.

8. A method for manufacturing a battery module connector according claim 1, wherein the method comprises:
   manufacturing the band-shaped wire braid by interweaving of a plurality of wires, wherein during the interweaving of the plurality of wires the at least one spring element is inserted into the band-shaped wire braid; and
   electrically conductive connecting of the band-shaped wire braid at the first end to the first contact element, and at the second end to the second contact element.

9. The method according to claim 8, wherein the at least one spring element is surrounded at least sectionally by the band-shaped wire braid and/or braided with the plurality of wires.

* * * * *